United States Patent

[11] 3,571,582

[72] Inventor Leroy U. C. Kelling
Waynesboro, Va.
[21] Appl. No. 709,404
[22] Filed Feb. 29, 1968
[45] Patented Mar. 23, 1971
[73] Assignee General Electric Company

*Primary Examiner*—Malcolm A. Morrison
*Assistant Examiner*—David H. Malzahn
*Attorneys*—Lawrence G. Norris, Michael Masnik, Stanley C. Corwin, Frank L. Neuhauser, Oscar B. Waddell and Melvin M. Goldenberg

[54] SERIAL BCD ADDER/SUBTRACTER UTILIZING INTERLACED DATA
13 Claims, 5 Drawing Figs.

[52] U.S. Cl. .......... 235/170, 235/176
[51] Int. Cl. .......... G06f 7/50
[50] Field of Search .......... 235/170, 176

[56] References Cited
UNITED STATES PATENTS

| | | | |
|---|---|---|---|
| 3,083,910 | 4/1963 | Berkin | 235/170X |
| 3,019,979 | 2/1962 | Townsend | 235/170 |
| 2,872,107 | 2/1959 | Burkhart | 235/170 |
| 3,105,898 | 10/1963 | Bell et al. | 235/176 |

ABSTRACT: A serial digital adding/subtracting arrangement for binary coded decimal data presented in interlaced format. The input data comprises a series of multidigit decimal words interlaced by serially presenting the least significant digit of each word in predetermined sequence, followed by the next digit of each word similarly interlaced, and so on throughout the data. The adding/subtracting utilizes two full adder/subtracters, the first for adding or subtracting the input data, the second for adding or subtracting six to or from the sum or difference generated by the first. The presence of a carry from either adder during the fourth bit time indicates the need for a radix correction from binary to decimal in which case the output of the second adder is selected. Several shift registers, one associated with each word, are provided to store the interdigital carries associated with that word during the processing of other words through the system.

INVENTOR.
LEROY U. C. KELLING

BY Michael Masnik
HIS ATTORNEY

INVENTOR.
LEROY U.C. KELLING

BY Michael Masnik
HIS ATTORNEY

INVENTOR.
LEROY U. C. KELLING
BY Michael Masnik
HIS ATTORNEY

INVENTOR.
LEROY U. C. KELLING
BY Michael Masnik
HIS ATTORNEY

INVENTOR.
LEROY U. C. KELLING
BY Michael Masnik
HIS ATTORNEY

SERIAL BCD ADDER/SUBTRACTER UTILIZING INTERLACED DATA

BACKGROUND OF THE INVENTION

This invention relates to a serial adding/subtracting for the processing of digital data presented in coded group form. More specifically, the invention relates to such adding/subtracting for processing digital data in binary coded decimal form which is interlaced according to a particular format.

Serial adder/subtracters for digital data in binary coded decimal BCD form are well-known. Since these adder/subtracters operate in pure binary and the input data is in BCD, it is necessary to effect corrections after certain additions, due to the difference in the radix of notation. This correction generally amounts to the addition or subtraction of six in BCD from. A typical adder of the known type utilizes a first full adder to add the two numbers together in pure binary fashion. A second full adder is provided and is used to add a six correction digit, referred to as a "filler" digit, to the output of the first adder. The outputs of both adders are then passed through delay devices which impart a delay equal to one BCD digit. If a carry from either of these adders is sensed after the processing of the fourth bit of the BCD digits being added, the need for the six correction is recognized and accordingly the output of the delay device connected to the second adder is selected as the output sum. If, on the other hand, no carry is generated during the processing of the fourth bit of the BCD digits in either adder, there is no need for a correction and the output of the delay device connected to the first adder is selected as the appropriate output sum. Such a system is utilized then to add two digits presented in conventional serial fashion.

In certain applications, particularly control systems for machine tools, it is desired to present the data in an interlaced fashion. The data is interlaced by presenting several words, i.e., multidigit decimal numbers, in an interwoven fashion. The data is interlaced by first presenting the least significant digit of the first word in BCD form with the BCD bits arranged in ascending order. This is followed by the least significant digit of each successive word, similarly encoded and arranged. After the least significant digits are presented, the next to the least significant digits are presented, beginning again with the first word and processing through all the successive words. If, for example, the three two-digit words; 28, 86 and 71, are to be interlaced in that order, the data would appear as follows:

0001(8)0110(6)1000(1)0100(2)0001(8)1110(7)

This method of interlacing is particularly useful in applications where it is desired to add two words on a repetitive basis since it is only necessary to delay each digit of the first word and then add the two words on a digit-by-digit basis.

It will be apparent, however, that it is not possible to utilize BCD adders known in the prior art to add data in this format, primarily due to the problem of handling interdigital carries.

Accordingly, it is an object of this invention to provide an improved signal-processing arrangement.

It is a further object of this invention to provide a serial BCD adder/subtracter for handling interlaced data in the format described.

The problem alluded to above, the handling of interdigital carries, results from the fact that after the processing of the first digit of a particular word there may be an interdigital carry which must be utilized when the next digit of this word is operated on. However, due to the data format, this next digit does not appear until after the other interlaced words have been processed.

Accordingly, it is an object of this invention to selectively store and relay interdigital carries during the processing of interlaced data.

SUMMARY OF THE INVENTION

In order to properly handle the processing of BCD data interlaced as described, this invention provides for the selective storage and relaying of interdigital carries in the sequence in which the data is presented. The input data is represented by two trains of interlaced words, each word consisting of several digits in coded group form. These words are added or subtracted as they appear, on a digit by digit basis. The addition or subtraction takes place bit-by-bit and binary carries or borrows are appropriately delayed and then presented during the processing of succeeding bits. In the event an interdigital carry is generated, this carry is selectively stored and then presented for processing with the next digit of the word with which it is associated.

BRIEF DESCRIPTION OF THE DRAWING

While the specification concludes with claims particularly pointing out what is considered to be the invention, reference to the attached drawings in conjunction with the specification will illustrate a particular embodiment thereof.

FIG. 1*a* is a logic diagram of the shift diagram register utilized by the invention;

FIG. 1*b* is a timing diagram illustrating the operation of the shift register of FIG. 1*a;*

DESCRIPTION AND METHOD OF OPERATION OF THE PREFERRED EMBODIMENT

Figure 1:
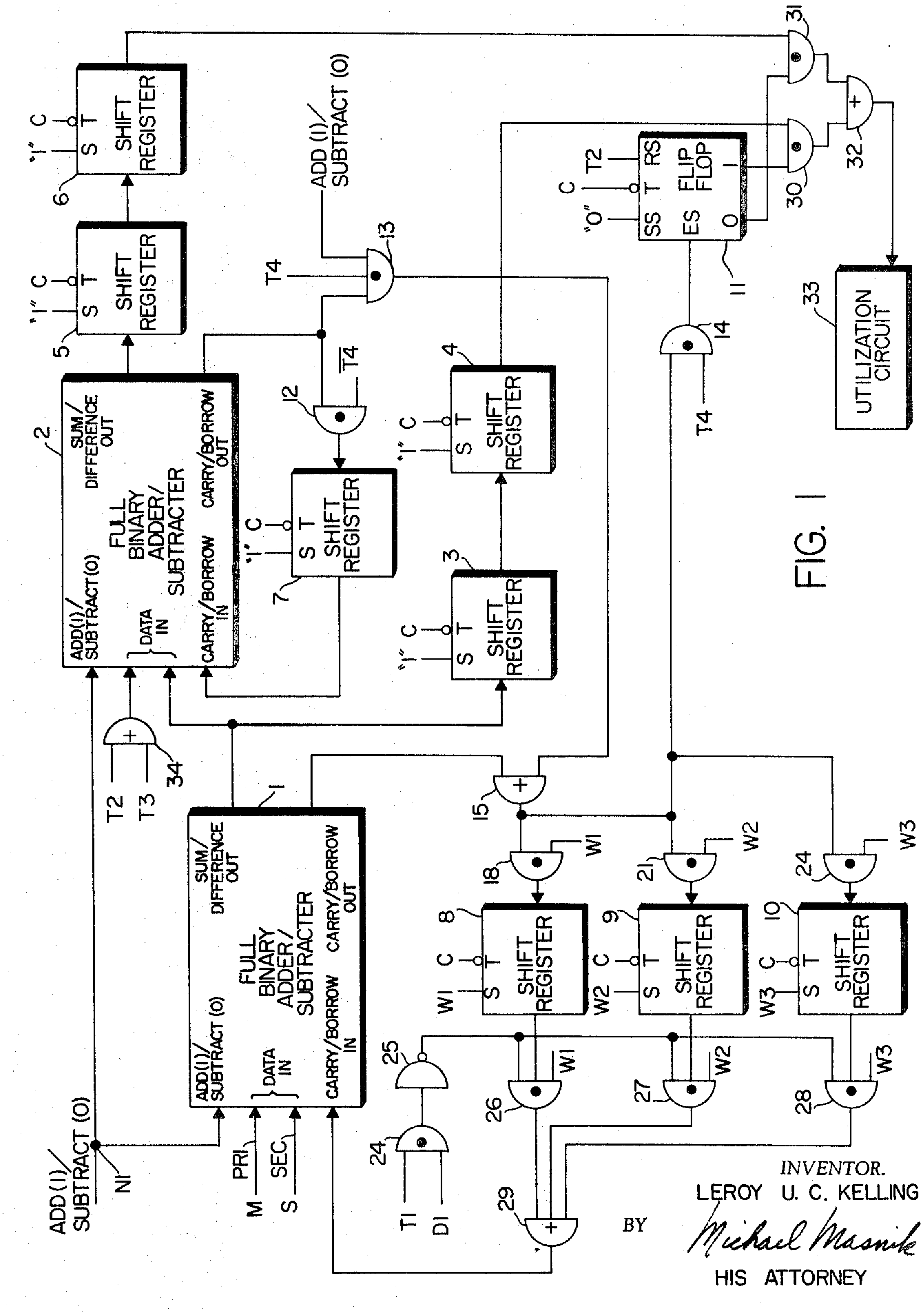
FIG. 1 is a logic diagram of a serial adder/subtracter comprising the invention.
Figure 1:
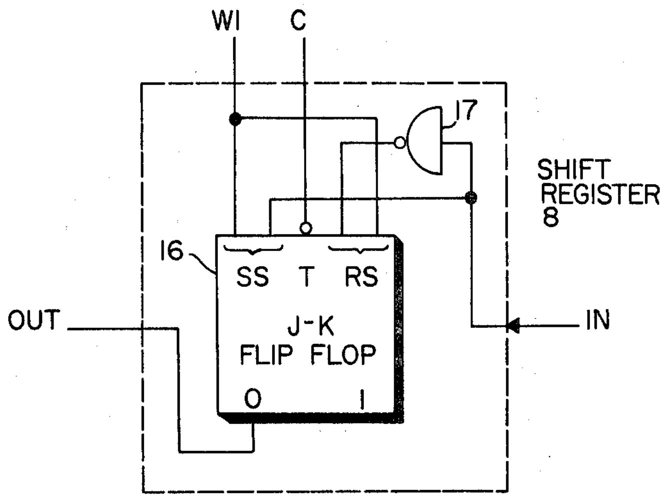
Figure 1:
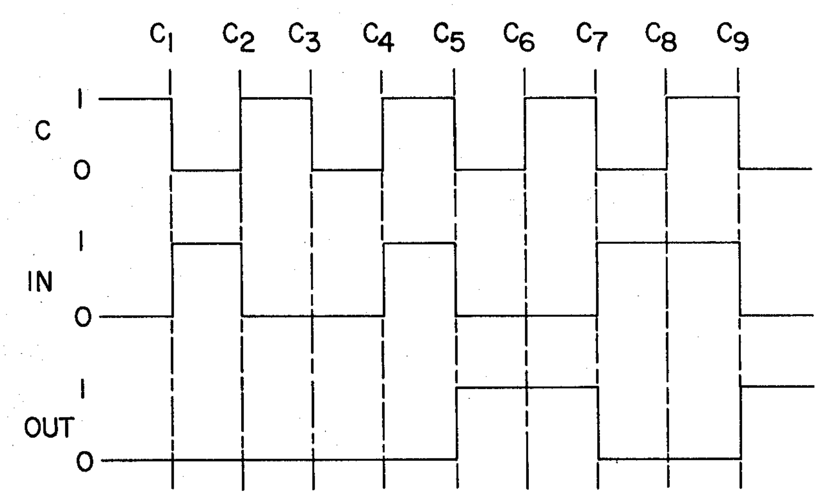

Referring now to FIG. 1, there is illustrated the logic diagram of a serial adder/subtracter which illustrates the invention. Hereinafter, for the sake of simplicity, the word "adder" will be used to denote "adder/subtracter." Similarly, the word "carry" will be used to denote a carry when the operation is addition and a borrow when the operation is subtraction. Finally, the word "sum" will be used to denote sum when the operation is addition and difference when the operation is subtraction.

DESCRIPTION OF THE LOGIC ELEMENTS

Before turning specifically to a description of the logic diagram in FIG. 1, a brief explanation of the logic elements will be given. The logic diagram of FIG. 1 utilizes positive logic with AND and OR logic gates, but it is understood that the particular type logic to be used is not a limitation of the invention. The use, for example, of other logic such as NOR or NAND logic would suffice equally well without, in any way, departing from the spirit of the invention.

Gate 34 is illustrative of a two input OR gate. The presence of a logic 1 at either of the two inputs results in a logic at the output. Similarly, gate 29 is a three input OR gate such that the presence of a logic 1 at any of the three inputs results in a logic 1 at the output.

Gate 24 is representative of a two input AND gate. The presence of a logic 1 at both inputs results in a logic 1 at the output. Similarly, gate 26 represents a three input AND gate such that there must be a logic 1 at all three inputs before the output assumes a logic 1 state.

Inverter 17 is of the conventional type which simply inverts the input signal so that a logic 0 at the input results in a logic 1 at the output and vice versa.

Shift register 8 represents a clock shift register. It has three inputs and one output. The input denoted S is the steering input and requires the presence of a logic 1 before the shift register will operate. Similarly, the input labeled T is the trigger input. The presence of a circle at this input indicates that a logic 0 is required to trigger the register. The third input, denoted by the arrowhead, is the input for the signal to be shifted. Assuming that the steering input S is a logic 1 so as to permit shifting, the signal present at the input will be shifted into the shift register 8 the next time the trigger input T goes to logic 0. Simultaneous presentation of a pulse at the signal input and a logic 0 at the trigger input T will not cause the register to shift the signal in. The input signal serves as a steering signal and steering must precede trigger by some minimum time which is a function of the particular hardware used. On the other hand, if the signal at the input is leaving at the same time that the trigger goes to logic 0 the register will shift the input signal.

Shift register 8 may be constructed, as shown in FIG. 1*a*, using a standing J-K flip-flop 16 and an inverter 17. As is well-known, a J-K flip-flop conventionally has several input terminals for set steering (denoted SS), all of which must be at logic 1 to steer the flip-flop to set. Similarly, there are provided several input terminals for reset steering (denoted RS), all of which must be at logic 1 to steer the flip-flop to reset. The trigger terminal (denoted T) requires, as indicated by the circle at that input, a signal going to logic 0 to trigger the flip-flop. If both set and reset steering requirements are met simultaneously, the next trigger signal will cause the flip-flop to change state, i.e., set if it was previously reset and rest if it was previously set. The two outputs shown labeled 0 and 1 reflect the logic signal present during the normal or reset state. When the flip-flop sets, these signals assume the opposite state, i.e., output 0 to logic 1 and output 1 goes to logic 0.

In order to cause the flip-flop to set, the set steering inputs must be at logic 1 prior to the arrival of a logic 0 at the trigger. Hence, if the set steering inputs SS go to logic 1 simultaneously with the arrival of a logic 0 at the trigger T, the flip-flop will not set. On the other hand, if the steering terminals go to logic 1 prior to the arrival of a logic 0 at the trigger T but one or more of the steering inputs change to logic 0 at the same time the trigger goes to logic 0, the flip-flop will set.

The operation of shift register 8 is illustrated in FIG. 1*b*. This operation will be illustrated assuming that steering signal W1 is a logic 1. If it is not, then neither the set or reset steering requirements are satisfied and consequently the shift register will retain the last signal stored and ignore any succeeding input signals. At time C1, the input signal IN goes to logic 1, satisfying the set steering requirement. However, since the trigger signal C went to logic 0 the same time as the steering requirements were met, steering did not precede signal and the flip-flop 16 did not set. At time C4, the input signal IN again goes to logic 1 satisfying set steering requirements and at time C5 the trigger signal goes to logic 0 causing flip-flop 16 to set, changing signal OUT to a logic 1. At time C7, the signal IN again goes to logic 1 satisfying steering requirements but since signal IN was previously a logic 0, reset steering equipment requirements were met prior to the arrival of the trigger signal C at C7 time and, accordingly, flip-flop 16 will reset at C7 time, changing signal OUT back to logic 0. At the next trigger, C9, the flip-flop 16 will again set, changing the signal OUT back to logic 1. Accordingly, it is seen that signals received at the input IN will be delayed and then presented at output OUT. This completes the description of the clocked shift register.

Flip-flop 11 is illustrated with four inputs. The first, denoted ES, is the electronic set terminal. The presence of a logic 1 at this terminal causes the flip-flop to go immediately into the set state. The terminal denoted SS is the set-steering terminal. Similarly, the terminal denoted RS is the reset-steering terminal. Between these terminals, denoted by the letter T, is the common trigger terminal. The presence of a logic one at the set-steering terminal will steer the flip-flop to set the next time the trigger terminal goes to logic 0. Similarly, the presence of logic 1 at the reset-steering terminal will cause the flip-flop to reset the next time the trigger signal goes to logic 0. The output terminals of flip-flop 11 are denoted by a 0 and a 1. These notations indicate the state of the logic signal present when the flip-flop is in its normal or reset state. When the flip-flop is set, these signals reverse sense.

Full binary adder/subtractor 1 has four output terminals denoted by the arrowheads. The Add(1)/Subtract(0) terminal is equipped to receive an instruction indicative of the operation, i.e., addition or subtraction, to be performed. The next two input terminals are the Data In terminals and are equipped to receive the two BCD numbers to be added or subtracted. The input data may be supplied, for example, from a source such as the output of a recirculating delay line or magnetic drum or from external storage devices specially equipped to encode data in the desired format and shift it out in serial fashion. The last input is the Carry/Borrow Input terminal which is equipped to receive any carries or borrows commands such as may have been generated during preceding manipulations. Full binary adder/subtractor 1 has two outputs, the Sum/Difference Out and the Carry/Borrow Out. The Sum/Difference Out terminal relays signals indicative of the one bit binary sum or difference resulting from manipulation of the input data. The Carry/Borrow Out terminal is equipped to relay signals which are indicative of carries or borrows which result during the processing of the input data.

THE CLOCK OSCILLATOR AND TIMING CIRCUITS

Figure 2:
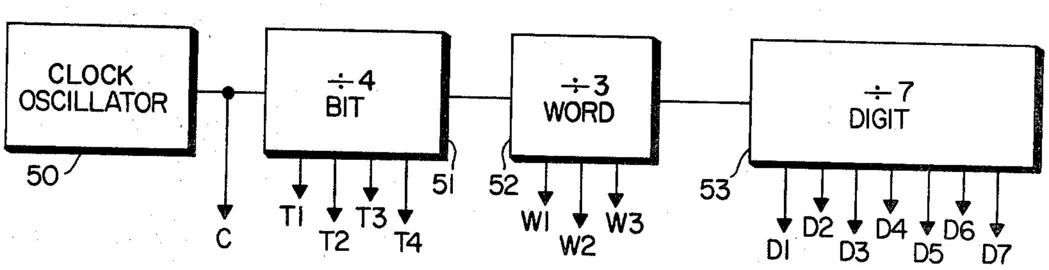
FIG. 2 is a block diagram of the clock oscillator and timing circuit.
Figure 3:
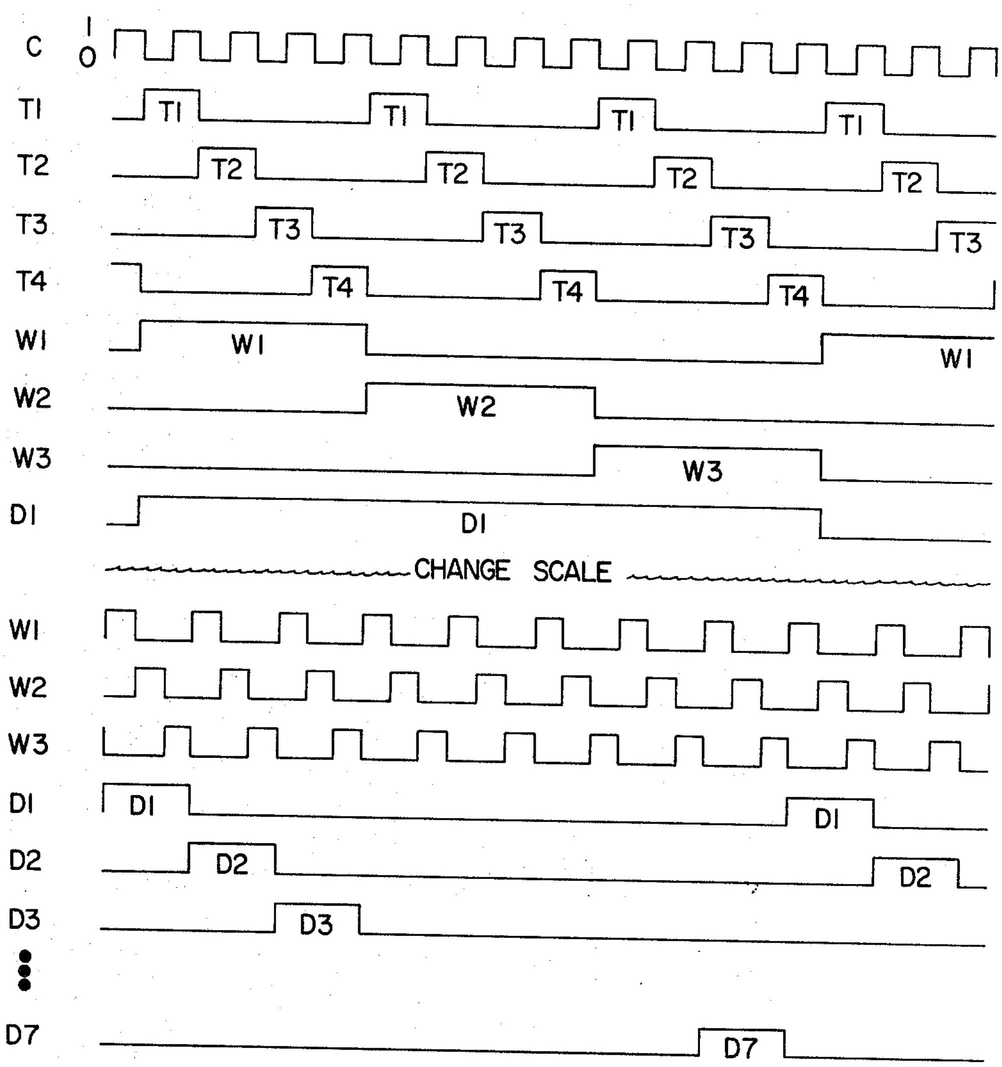
FIG. 3 is a timing diagram showing the waveforms of the clock oscillator and timing circuit.

Turning first to FIG. 2, there is shown a main clock oscillator and the timing and synchronizing circuits of the subject invention. A clock oscillator 50 generates the main clock signal C which may be, for example, 5 MHz. The output of the clock oscillator 50 is fed into a suitable divider circuit 51 which divides the main clock signal into four parts. This divider circuit 51 may consist, for example, of a series of shift register, or, alternatively, may be a counter of the well-known type. The signals generated by the divide by 4 circuit 51 are shown in FIG. 3 as signals T1, T2, T3 and T4. These signals are used to synchronize the presentation of the four binary bits of interlaced data, in ascending order. Hence, during T1 time, the first binary bit of a BCD number is present at the input of the adder of the present invention. Similarly, during T2 time the second bit is present at the input of the adder. During T3 time, bit 3 is present and during T4 time, bit 4 is present. The divide by 4 counter then feeds into a divide by 3 counter 52, which may be similarly constructed and constitutes means for generating signals indicative of the 3 interlaced words. These signals, shown in FIG. 3, are signals W1, W2 and W3. Accordingly, when signal W1 is present, this indicates that word 1 is presently being processed by the adder. The presence of signal W2 indicates that word 2 is being processed and signal W3 indicates the presence of word 3. The divide by 3 counter feeds into a divide by 7 circuit 53 for generating signals indicative of the 7 digits. It should be pointed out, at this time, that the subject invention is not necessarily limited to use with three words or 7 digits but may accommodate any number of words and digits, as for example, by appropriately changing the configuration of the clock oscillator and timing circuit. The outputs of the divide by 7 circuit 53 are D1—D7. Signal D1 indicates the presence of the first or least significant digit, D2 indicates the second or next to least significant digit and so forth. These outputs are shown in FIG. 3. FIG. 3 is, at this point, altered with a change of scale by representing signals W1, W2, and W3.

It will be seen, then, that the signals T1 through T4, W1 through W3, and D1 through D7 are sufficient to completely identify a particular bit upon its presentation at the input of the adder of the subject invention. In this fashion, a signal which occurs at T1, W1, D1 time indicates that this is the first bit of the first word, least significant digit. Similarly, during T3, W2, D2 time, the third bit of the second word, next to least significant digit is presently being presented. Hereinafter, these timing signals will be referred to simply as T3W2D2 time.

OPERATION OF THE ADDER/SUBTRACTER

In FIG. 1, the two trains of input data in interlaced form, represented by the letters "M" and "S", are presented to the Data In terminals of full binary adder/subtracter 1. Full adder 1 acts to sum the input on a bit-by-bit basis, presenting this summation at the Sum/Difference Out terminal. The output of full adder 1 also includes the carries generated as a result of this bit-by-bit addition, these carries being generated at Carry/Borrow Out terminal of full adder 1. The handling of these carries will be discussed in greater detail hereinafter. The output sum, on a bit-by-bit basis, is relayed from the full adder 1 to one of the Data In terminals of full binary adder/subtracter 2. OR gate 11 has as its inputs the signals T2 and T3. The output of gate 34, as will be seen later, represents the number 6 in BCD form and is fed to the other Data In terminal of full adder 2. Hence, the Sum/Difference Out terminal of full adder 2 represents the output from full adder 1 increased by the addition of six in full adder 2.

AND gate 12 has one input connected to the Carry/Borrow Out terminal of full adder 2. The purpose of AND gate 12 is to relay carries between binary bits to shift register 7 where they are delayed one bit time and then presented at the Carry/Borrow In terminal of full adder 2. Shift register 7 has its steering terminal S connected to logic 1 and will shift with every clock pulse C. Since only binary carries are relayed, any carries generated at T4 time are to be ignored and therefore the signal $\overline{T4}$ is connected to the second input of AND gate 12 to inhibit AND gate 12 during T4 time.

The output of full adder 1 is also relayed to the input of shift register 3 where it is shifted into shift register 3 and held there for one bit time until it is relayed to the input of shift register 4. The shift registers 3 and 4 have their steering terminals S connected to logic 1 and will shift with every clock pulse C. Shift register 4 similarly holds the output from shift register 3 one bit time and then shifts it out to one input of AND gate 30. In a similar fashion, the output of full adder 2 is first shifted into shift register 5 and held there for one bit time and then relayed to the input of shift register 6 where it is held for a second bit time. The shift registers 5 and 6 have their steering terminals S connected to logic 1 and will shift with every clock pulse C. The output of shift register 6 is then fed into one input of AND gate 31. The AND gates 30 and 31 feed into gate 32 whose output is fed to utilization circuit 33. Gates 30 and 31 act to select either the output of full adder 1 or the output of full adder 2 as will be described hereinafter.

Returning now to the handling of carries from full adder 1, it will be seen that the carries generated are fed to one input of OR gate 15 from Carry/Borrow Out terminal of full adder 1. The output of OR gate 15 is fed to one input of first gating means, the AND gates 18, 21 and 24. If, for example, the word presently being processed in full adder 1 is word 1, this is indicated by the presence of signal W1. Accordingly, at the next clock time, which corresponds to the next bit time, the carry generated in full adder 1 is shifted into shift register 8, whose output forms one input to AND gate 26, part of second gating means for relaying carries to the full adder 1. The second input of AND gate 26 is signal W1. The third input to AND gate 26 comes from the output of inverter 25 and is normally at a logic 1 or permissive state. The function of AND gate 24 and inverter 25 will be described later. Hence, the carry which was generated during the processing of one bit in the addition in full adder 1 is held and, during the next bit time, shifted into shift register 8. The output of shift register 8 forms one input of AND gate 26 whose output is fed into one input or OR gate 29. The output of OR gate 29 is fed into the Carry/Borrow In terminal of full adder 1, thereby relaying the carry generated during the processing of the previous bit to the input of full adder 1 for appropriate processing during the next bit of the same word. This operation takes place during operation on all four binary bits.

AND gate 24 and inverter 25 serve to inhibit any leftover interdigital carries which might be relayed during the processing of the first bit of the first digit of all three words. The inputs to AND gate 24 are the signals T1 and D1. Accordingly, during T1D1 time, the output of AND gate 24 is a logic 1 which is fed to inverter 25. The output of inverter 25 is then a logic 0 which inhibits the second gating means AND gate 26, 27 and 28 and thereby prevents the relaying of interdigital carries during the first bit of the least significant digit of all three words.

If, however, the bit which generated the carry was the most significant bit of a BCD digit, this carry must be held in shift register 8 until such time as the next digit of word 1 is presented at the input of full adder 1. It can be seen that this is accomplished by virtue of the fact that when the processing of word 1 is complete, the signal W1 goes to a logic 0 thereby inhibiting any further steering of shift register 8 which then holds the carry generated until such time as word 1 is presented again at the input. It should be noted at this point, that carries generated during the processing of words 2 and 3 are similarly handled, with carries from word 2 being stored and shifted by shift register 9 and carries generated during word 3 time being stored and shifted by shift register 10.

The significant of a carry from the full adder 1 during bit 4 time, i.e., T4, is that the sum of the two BCD digits added must have exceeded 15 in order to generate a carry since the full adder 1 operates in pure binary. This is one indication of an interdigital carry. On the other hand, interdigital carries should be generated for any sum between 10 and 19. The detection of sums in excess of 9 but less than 16 is effected by gate 13. This gate has as one input the carry output of full adder 2. The second input is the signal T4 which indicates that bit 4 is being processed. The third input serves to enable this gate when the system is operating in addition. It will be noted, that there will be a carry out of full adder 2 during bit 4 time any time the sum of the numbers added therein exceeds 16. Since this adder adds six to the sum of the two digits M + S, this output will indicate that M + S was 10 or greater. The output of gate 13 is then relayed to the second input or OR gate 15.

In addition to relaying both binary and interdigital carries to the shift registers, the output of gate 15 is connected to one input of AND gate 14. The other input of the AND gate 14 is the signal T4 which activates the gate during the processing of the fourth bit. Hence an output from AND gate 14 is indicative of an interdigital carry. Since an interdigital carry indicates that the sum of the input data was greater than 9, it also indicates that the sum generated in full adder 1 is incorrect and that the output of full adder 2 must be selected. Accordingly, the output of gate 14 is fed into the electronic set terminal ES of flip-flop 11, causing it to assume the set state. It is pertinent to note the state of the numbers summed at T4 time. The first bit of a four bit BCD number has already been taken from shift register 4 and gated through AND gate 30 and OR gate 32 to indicate the first bit of the final sum. The second bit is presently in shift registers 4 and 6, the third bit in shift registers 3 and 5 and the fourth bit appears at the output of the two full adders 1 and 2. Since the correction by adding 6 in BCD form does not in any way affect the first bit, it is at this point that the need for recognition of which sum is to be gated out is required.

As pointed out above, any time the sum was greater than 9, flip-flop 11 sets at T4 time. Setting flip-flop 11 causes its outputs 0 and 1 to reverse state. This inhibits AND gate 30 and activates AND gate 31 thereby gating out the corrected sum generated in full adder 2. Flip-flop 11 stays set until the first time trigger signal C goes to logic 0 after the presence of signal T2 at the reset steering terminal. Hence, flip-flop 11 is set during T4, T1 and T2 times thereby allowing the last three BCD bits to be selected from the output of full adder 2.

ILLUSTRATION OF INTERLACING

Figure 4:
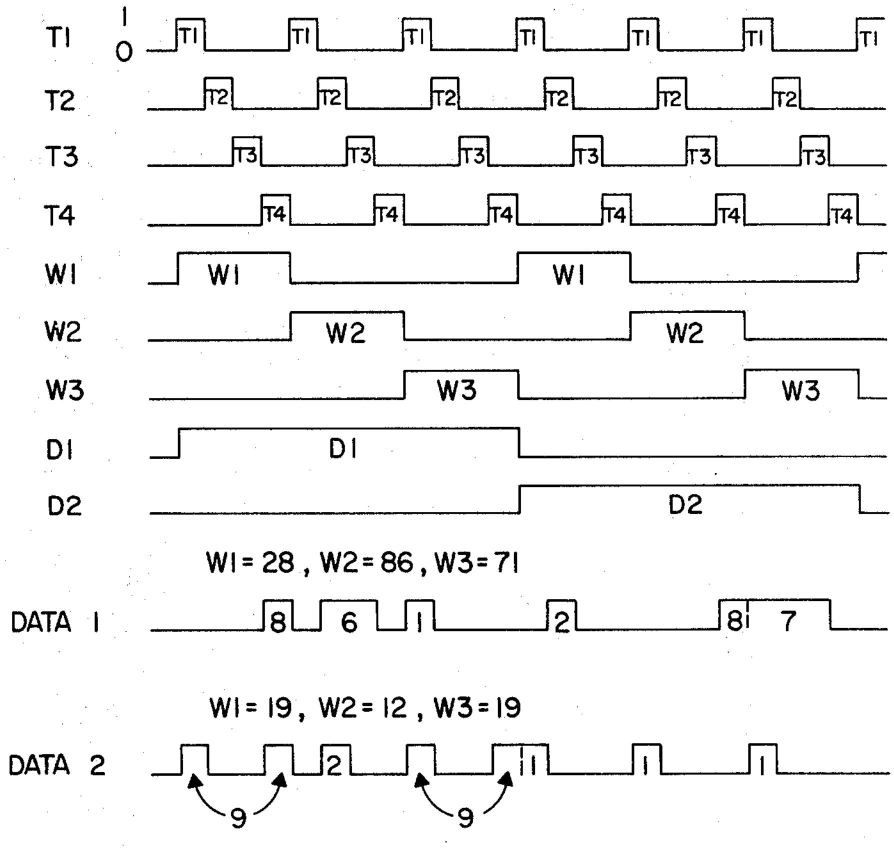
FIG. 4 is a timing diagram illustrating the waveforms of the input data.

Referring now to FIG. 4, there is shown an illustration of data interlaced as set forth above. For identification purposes the signals T1 through T4, W1 through W3 and D1-2 are set forth at the top of FIG. 4. If it is desired to interlace the three two-bit words 28, 86 and 71, in that order, reference is now made to the signal shown as Data 1. The first word being 28, and interlacing occurring beginning with the least significant digit of word 1 and in the ascending order of the binary coded decimal format it is shown that this digit is represented during W1D1 time, the presence of a logic 1 at T4W1D1 time indicating the number 8 in BCD. Having represented the least significant digit of the first word, it is now necessary to represent the least significant digit of the second word, 86. Accordingly, the signal Data 1 goes to the logic 1 state during T2W2D1 time and T3W2D1 time, thereby representing the number 6 in binary coded decimal form. Next, it is necessary to represent the least significant digit of the third word, 71. Accordingly, the signal Data 1 goes to logic 1 at T1W3D1 time. Having now interlaced the three least significant digits of each word, it is necessary to interlace the next digits, beginning again at word 1. Accordingly, since word 1 is 28, signal Data 1 goes positive at T2W1D2 time thereby indicating the digit 2 in BCD form. It is now necessary to interlace the second digit of word 2 which is 86 and accordingly signal Data 1 goes to logic 1 at T4W2D2 time thereby indicating the number 8 in binary coded decimal form. Finally it is necessary to write the number 7, it being the next significant digit of word 3 which is 71. Accordingly, signal Data 1 goes to logic 1 during T1W3D2, T2W3D2, and T3W3D2 time, thereby representing the digit 7 in binary coded decimal form.

The signal Data 2, in FIG. 4, represents a similar interlacing of three more two-digit words, namely 19, 12 and 19 in that order.

AN ILLUSTRATIVE EXAMPLE

Figure 5:
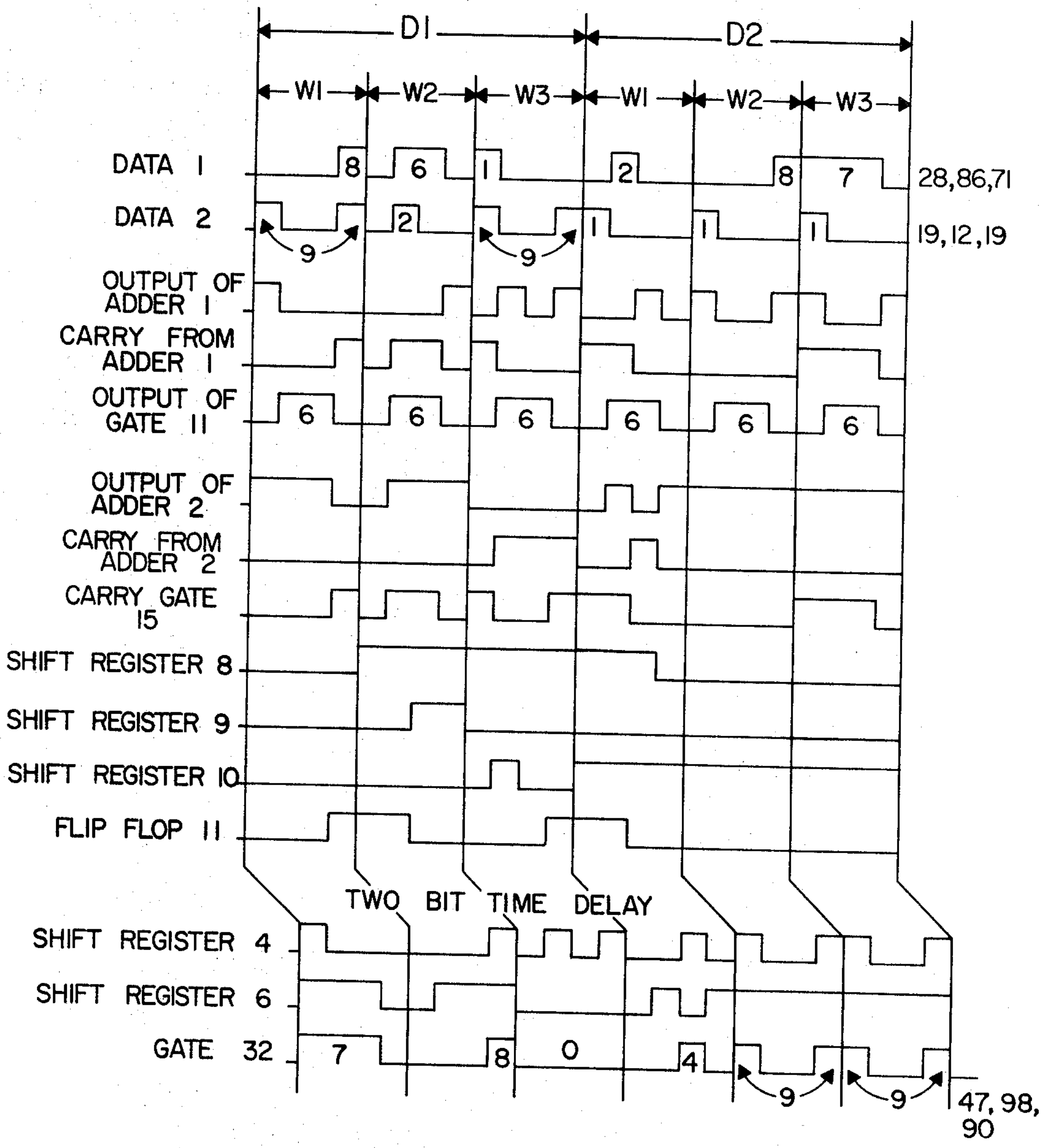
FIG. 5 is a timing diagram illustrating the operation of the serial adder/subtractor.

Referring now to FIG. 5, there is shown a series of waveforms illustrating the operation of the subject invention. This illustration will show the addition of the two trains of interlaced data previously shown in FIG. 4. In the first train of input data, labeled "Data 1" W1 = 28, W2 = 86, and W3 = 71. In the second stream of input data, labeled "Data 2," W1 = 19; W2 = 12, and W = 19. The addition of these two trains of data will result W1 = 28 + 19 = 47; W2 = 86 + 98; and W3 = 71 + 19 = 90.

Since FIG. 5 does not include the clock and timing diagrams, the figure has been divided by a series of perpendicular lines indicative of the timing relationship. Accordingly, the first half of FIG. 5 is indicative of the D1 time and the last half of D2 time. Within D1 time, FIG. 5 is divided into W1, W2 and W3. Although not specifically shown, each of the word times W1, W2 and W3, are also divided into the four bit times, T1 through T4.

The waveform labeled "Output of Adder 1" is indicative of the signal present at the Sum/Difference Out terminal of full adder 1 during the processing of the input data. Similarly, the waveform labeled "Carry from Adder 1" is indicative of the output of the Carry/Borrow Out terminal of full adder 1. As pointed out above, OR gate 11 is utilized to generate the number 6 in BCD form for forming ONE input to adder 2. Accordingly, the waveform labeled "Output of Gate 11" illustrates the continuous generation of six in binary coded decimal form. As was fully pointed out above, the function of full adder 2 is to add six to the output of full adder 1. The waveform labeled "Output of Adder 2" indicates the results of this addition. Similarly, the waveform labeled "Carry from Adder 2" is indicative of the output of the Carry/Borrow Out terminal of adder 2. As may be seen by referring to FIG. 1, the output of OR gate 15 governs the relaying of of carries to the shift registers 8, 9 and 10 associated with full adder 1. The output of this OR gate 15 is a function of the carries received from the Carry/Borrow Out terminal of full adder 1 and the outputs from AND gate 13. The function of AND gate 13 is to relay any carries generated T4 time from full adder 2. Accordingly, the waveform indicated "Carry Gate 15" illustrates the carries which are to be relayed to the three shift registers, 8, 9 and 10.

Briefly summing up the operation of the three shift registers as indicated above, shift register 8 operates to store and relay all carries generating during word 1 time. Similarly, shift register 9 operates to store and shift carries during word 2 time and finally shift register 10 is operative to store and relay carries during word 3 time.

Returning to the example in FIG. 5, there is shown a carry generated at T4W1D1 time. At the next clock pulse, C, this carry is stored in shift register 8 but, the fact that it was generated during T4 time indicates the need to store it until the next significant digit of word 1 is presented. This is accomplished by virtue of the fact that the steering signal W1 on shift register 8 is removed at the next clock time, i.e., T1W2D1. Hence, this carry is relayed into shift register 8 and held there until signal W1 returns, i.e., at T1W1D2, at which time the carry is presented at the Carry/Borrow In terminal of full adder 1. As is seen from the waveform labeled "Shift Register 8", at T1W1D2 time, the carry previously stored is relayed to the input of full adder 1. However, the operation at this time also generates a carry which is simultaneously stored in shift register 8. Since carries are generated during T1W1D2 and T2W1D2 times, shift register 8 operates to store these two carries after relaying the carry generated at T4W1D1 time. Referring again to the waveform labeled "Carry Gate 15" it is noted that there is a carry output from carry gate 15 at T2W2D1 time and at T3W2D1 time. These carries, being generated during W2 turn, are sequentially stored and shifted by shift register 9 at T3W2D1 and T4W2D1 times, as shown in the waveform labeled "Shift Register 9".

Finally, referring to the waveform labeled "Shift Register 10," reference to the waveform labeled "Carry Gate 15" shows that there are 2 carries relayed during W3D1 time, at T1W3D1 and T4W3D1. The first carry, occurring at T1W3D1 time is presented at T2W3D1 by shift register 10. The second carry, occurring at T4W3D1 time, however, must be stored until the presentation of the next digit of word 3. Accordingly, this carry is held in shift register 10 until T1W3D2 time at which time it is presented at the input of full adder 1. However, it is noted that three more carries, during T1W3D2, T2W3D2 and T3W3D2 times are generated by full adder 1. Accordingly, these carries are relayed to shift register 10 where they are sequentially stored and relayed to the input of full adder 1.

As was noted above, AND gate 14 functions to set flip-flop 11 when the output of full adder 2 is to be selected as the final sum whenever there has been a carry at 74 time. Accordingly the waveform labeled "Flip-flop 11" indicates the state of that flip-flop. Referring to this waveform it will be seen that there is a carry generated during T4W1D1 time, thereby setting flip-flop 11. Flip-flop 11 stays set until the end of the next T2 time, i.e., T2W2D1, at which time it resets. The next carry during T4 time occurs at T4W3D1 time at which time flip-flop 11 again sets, staying set until T2W1D2 time.

At this point, in FIG. 5, there is noted the two bits of time delay which occur in shift registers 3 and 4 associated with full adder 1 and shift registers 5 and 6 associated with full adder 2. The waveform labeled "Shift Register 4" and "Shift Register 6" indicates the output of these shift registers. As was noted above, the effect of setting flip-flop 11 is to select the output of shift register 6 as the final sum. Accordingly, the waveform labeled "Gate 32" is a composite of the two waveforms labeled "Shift Register 4" and "Shift Register 6." The waveform labeled "Gate 32" is identical with waveform labeled "Shift Register 4" so long as flip-flop 11 remains reset. However, if flip-flop 11 sets, the waveform labeled "Gate 32" is identical with the waveform labeled "Shift Register 6." Examination of the waveform labeled "Gate 32" reveals that the final sum, i.e., W1 = 47, W2 = 98, and W3 = 90, is therein represented.

While the foregoing has been a description of a particular embodiment illustrating the invention, the appended claims are intended to cover all forms which fall within the scope of the invention. As was pointed out in the specifications, the word "adder" is intended to mean "adder or subtracter," the word "adding" to mean "adding or subtracting", the word "-carry" to mean "carry if adding or borrow if subtracting" and the word "sum" to mean "sum if adding or difference if subtracting." Such construction also applies to the claims that follow. n—

I claim:

1. A multiinput apparatus for computing data wherein said data at each of said inputs comprises a plurality of words of "N" decimal digits, each of said decimal digits being expressed in an "M" bit numerical code, said data being repetitively interlaced such that the *n*th digit of each of said plurality of words is serially presented followed by the $(N-1)$th decimal digit of each of said words, proceeding in this fashion until all digits are presented and wherein all of said data is so interlaced, comprising:

*a.* first means for sequentially adding said input words, one decimal digit at a time;
*b.* said first means comprising second means for generating interdigital carries for each interlaced word;
c. a plurality of storage means;
d. third means for sequentially relaying said interdigital carries for each interlaced word to respective ones of said plurality of storage means; and
e. fourth means for relaying said stored interdigital carries to the input of said first means in the sequence in which said words appear in said interlaced data.

2. The apparatus as recited in claim 1 wherein said storage means comprises a plurality of clocked shift registers.

3. The apparatus as recited in claim 1 further comprising fifth means for indicating which of said interlaced words is being added and wherein said third means comprises a plurality of first gating means operatively connected to the output of said interdigital carry generating means and said word indicating means, the outputs of each of said first gating means individually operatively connected to the input of a respective one of said storage means to activate said storage means to sequentially store said interdigital carries and said fourth means comprises a plurality of second gating means, each of said second gating means individually operatively connected to a respective output of one of said storage means and operatively connected to said word indicating means whereby said stored interdigital carries are sequentially relayed to the input of said adding means in the sequence in which said words appear in said interlaced data.

4. The apparatus as recited in claim 3 wherein said first gating means comprises a plurality of at least two input gates, the first of said inputs to said gate being operatively connected to said second means for generating interdigital carries and the second of said inputs being individually operatively connected to respective ones of said word indicating means.

5. The apparatus as recited in claim 1 wherein said first means comprises:

a. a first full adder operative to add said input data;
b. means for generating a correction digit;
c. a second full adder operatively connected to the output of said first adder and to the output of said correction generating means operative to add together said outputs;
d. first delay means operatively connected to the output of said first adder and second delay means operatively connected to the output of said second adder;
e. selection means connected to the outputs of said first and second delay means operative to select the output of said second delay means whenever an interdigital carry is generated; and
f. a utilization circuit operatively connected to the output of said selection means.

6. The apparatus as recited in claim 5 further comprising means operatively connected to the carry outputs of said first and second adders operative to recognize an interdigital carry during the processing of the most significant bit of each digit of said input data.

7. A multiinput digital adder for computing data wherein said data at each of said inputs comprises a plurality of words of "N" decimal digits, each of said decimal digits being expressed in binary coded decimal, said data being repetitively interlaced such that the *n*th digit of each of said plurality of words is presented followed by the (*n*— 1the decimal digit in ascending order of each of said words and wherein each digit is presented by presenting the four binary bits of the BCD code in ascending order and wherein all of said data is so interlaced, said digital adder comprising:

a. means for sequentially adding said input words on a bit-by-bit basis, one decimal digit at a time;
b. said last-named means comprising means for generating interdigital carries;
c. timing means for generating a series of signals indicative of the particular one of each of said plurality of words;
d. a plurality of two input AND gates, the first of said inputs being operatively connected to said means for generating interdigital carries, and each of the second of said inputs being individually operatively connected to a different one of said signals indicative of said plurality of words;
e. a plurality of clocked shift registers, individually operatively connected to the output of one of said plurality of two input AND gates, each of said shift registers being operative to store carries generated during the processing of data associated with each of said words;
f. a plurality of three input AND gates, having the first of said inputs connected to a blocking signal for inhibiting all of said input AND gates during the processing of the first bit of the first digit of said input data, the second of said inputs being individually operatively connected to the output of one of said plurality of shift registers, the third of said inputs being individually operatively connected to an individual one of said word indicating signals; and
g. a multiple input OR gate, the number of inputs being determined by the number of said plurality of three input AND gates, each of said inputs being connected to the output of one of said plurality of three input AND gates and the output of said multiple input OR gate being connected to an input of said adding means whereby said carries may be sequentially stored and relayed in the sequence in which said input words appear in said interlaced data.

8. A multiinput digital adder for computing data wherein said data at each of said inputs comprises a plurality of words of "N" decimal digits, each of said decimal digits being expressed in an "M" bit numerical code, said data being repetitively interlaced such that the *n*th digit of each of said plurality of words is serially presented followed by the $(n-1)$th decimal digit of each of said words, and wherein all of said data is so interlaced, said digital adder comprising:

a. first adding means for sequentially adding said input words, one decimal digit at a time; said first adding means comprising;
b. second means for generating interdigital carries;
c. a plurality of storage means;
d. third means for sequentially relaying said interdigital carries to said plurality of storage means;
e. fourth means for relaying said stored interdigital carries to the input of said first adding means in the sequence in which said words appear in said interlaced data;
f. means for generating a correction digit;
g. second adding means operatively connected to the output of said first adding means and to the output of said correction generating means operative to add together said outputs;
h. first delay means operatively connected to the output of said first adding means; second delay means operatively connected to the output of said second adding means;
i. selection means connected to the outputs of said first and second delay means operative to select the output of said second delay means whenever an interdigital carry is generated; and
j. a utilization circuit operatively connected to the output of said selection means.

9. Apparatus for processing data wherein said data is represented by a first and second train of pulses in coded group form, data of each of said trains comprising a plurality of words of N digits, each of said digits being expressed in an M bit numerical code where M is an integer greater than 1, said data being repetitively interlaced such that the *n*th digit of each of said plurality of words is serially presented followed by the *n*-1th decimal digit of each of said words proceeding in this fashion until all digits are presented, and wherein all of said data is so interlaced comprising first means including an input responsive to said two pulse trains for sequentially adding said two pulse trains one digit at a time to form a first sum, first binary carry and first interdigital carry pulse trains, a plurality of storage means one for each word, means for sequentially applying each of said first train binary and first train interdigital carries associated with each word to corresponding ones of said storage devices wherein each binary carry operates as a binary carry during adding of the binary bits of each digit and each interdigital carry operates as a carryover from one digit to the next most significant digit of that word, and means for applying said stored, first binary and stored first train interdigital carries to the input of said first means in the sequence in which said words appear in said interlaced data.

10. Apparatus for processing data wherein said data is represented by a first and second train of pulses in coded group form, data of each of said trains comprising a plurality of words of N decimal digits, each of said decimal digits being expressed in an M bit numerical code wherein M is an integer greater than 1, said data being repetitively interlaced such that the *n*th digit of each of said plurality of words is serially presented followed by the *n*-1th decimal digit of each of said words proceeding in this fashion until all digits are presented, and wherein all of said data is so interlaced comprising first means comprising an input responsive to said two pulse trains for sequentially adding said two pulse trains one decimal digit at a time to form first sum, first binary and first interdigital carry pulse trains, second means for generating filler pulses representing a filler digit equal to the difference between the radix of notation of said M bit code and the maximum radix possible with said M bits, third means including an input responsive to said first sum pulse train and said filler pulses for adding said first sum pulse train and said filler pulses one decimal digit at a time to form second sum, second binary carry and second interdigital carry pulse trains, means for sequentially applying each of said second train binary carries to the input of said second means, a plurality of storage means one for each word, means for sequentially applying each of said first train binary and first train interdigital carries associated with each word to corresponding ones of said storage devices wherein each binary carry operates as a binary carry during adding of the binary bits of each decimal digit and each interdigital carry operates as a decimal carry to carry over from one digit to the next most significant digit of that word, means for applying said stored, first train binary and stored, first train interdigital carries to the input of said first means in the sequence in which said words appear in said interlaced data, and means for correcting said first pulse train in response to the occurrence of said first or second train interdigital carries to provide a corrected sum pulse train which is the sum of said first sum and the numerical equivalent of said filler pulses.

11. An arrangement according to claim 10 wherein M is 4 and the filler digit is 6.

12. Apparatus for processing data wherein said data is represented by a first and second train of pulses in coded group form, data of each of said trains comprising a plurality of words of N decimal digits, each of said decimal digits being expressed in an M bit numerical code wherein M is an integer greater than 1, said data being repetitively interlaced such that the *n*-lth digit of each of said plurality of words is serially presented followed by the *n*-1th decimal digit of each of said words proceeding in this fashion until all digits are presented, and wherein all of said data is so interlaced comprising first means including an input responsive to said two pulse trains for sequentially adding said two pulse trains one decimal digit at a time to form a first sum, first binary carry and first interdigital carry pulse trains, second means for generating filler pulses representing a filler digit equal to the difference between the radix of notation of said M bit code and the maximum radix possible with said M bits, a plurality of storage means one for each word, means for sequentially applying each of said first train binary and first train interdigital carries associated with each word to corresponding ones of said storage devices wherein each binary carry operates as a binary carry during adding of the binary bits of each decimal digit and each interdigital carry operates as a decimal carry to carry over from one digit to the next most significant digit of that word, means for applying said stored, first binary and stored first train interdigital carries to the input of said first means in the sequence in which said words appear in said interlaced data and means for correcting said first sum pulse train in response to the first sum being in excess of said radix of notation of said M bit code to provide a corrected sum pulse train which is the sum of said first sum and the numerical equivalent of said filler pulses.

13. An arrangement according to claim 12 where M is 4 and the filler digit is 6.

UNITED STATES PATENT OFFICE

CERTIFICATE OF CORRECTION

Patent No. 3,571,582 Dated March 23, 1971

Inventor(s) Leroy U. C. Kelling

It is certified that error appears in the above-identified patent and that said Letters Patent are hereby corrected as shown below:

Column 1, line 16, "from" should read -- form --; line "processing" should read -- proceeding --. Column 5, line 6 "of" should read -- or --. Column 6, line 34, "of" should r -- or --. Column 7, line 37, "W=19" should read -- W3=19 -- line 38, after "result" insert -- in --. Column 9, line 14, after "words," insert -- on a bit-by-bit basis --. Column 1 line 52, after "words," insert -- on a bit-by-bit basis --. Column 11, line 12, after "trains" insert -- on a bit-by-bit basis, --; line 36, after "trains" insert -- on a bit-by-bit basis, --. Column 12, line 26, after "trains" insert -- on bit-by-bit basis, --.

Signed and sealed this 23rd day of May 1972.

(SEAL)
Attest:

EDWARD M.FLETCHER, JR.
Attesting Officer

ROBERT GOTTSCHALK
Commissioner of Patents